(12) United States Patent
Buchanan et al.

(10) Patent No.: US 10,007,517 B2
(45) Date of Patent: Jun. 26, 2018

(54) MULTIPLY-ACCUMULATE WITH VOLTAGE TRACKING MODULATION

(71) Applicant: HEWLETT PACKARD ENTERPRISE DEVELOPMENT LP, Houston, TX (US)

(72) Inventors: Brent Buchanan, Palo Alto, CA (US); Le Zheng, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 15/281,280

(22) Filed: Sep. 30, 2016

(65) Prior Publication Data

US 2018/0095748 A1 Apr. 5, 2018

(51) Int. Cl.
*G06F 9/30* (2018.01)
*G06N 3/04* (2006.01)
*G06N 3/063* (2006.01)

(52) U.S. Cl.
CPC ............. *G06F 9/3001* (2013.01); *G06N 3/04* (2013.01); *G06N 3/0635* (2013.01)

(58) Field of Classification Search
CPC ......... G06F 9/3001; G06N 3/04; G06N 3/065
See application file for complete search history.

(56) References Cited

U.S. PATENT DOCUMENTS

| 7,814,038 | B1* | 10/2010 | Repici | G06N 3/08 |
| | | | | 706/25 |
| 7,904,398 | B1* | 3/2011 | Repici | G06N 3/08 |
| | | | | 706/15 |
| 2002/0169729 | A1* | 11/2002 | Shi | G06N 3/063 |
| | | | | 706/15 |

OTHER PUBLICATIONS

Chen et al., "A Compact Multiply-Accumulate Architecture for Clustering Pulse-width Coded Biomedical Signals", 2015, pp. 83-86.*

* cited by examiner

*Primary Examiner* — Chuong D Ngo
(74) *Attorney, Agent, or Firm* — Hewlett Packard Enterprise Patent Department

(57) ABSTRACT

An example device may include multiply-accumulate circuitry and voltage-tracking modulator circuitry. The multiply-accumulate circuitry may be to increase and decrease an accumulation voltage held by an accumulator based on a number of input signals. The voltage-tracking modulator circuitry may be to generate an output signal based on the accumulation voltage, wherein the output signal is a continuous-time binary signal that tracks changes of the accumulation voltage by varying pulse widths of the output signal. The example device may be used as a neuron in a neural network.

20 Claims, 7 Drawing Sheets

MULTIPLY-ACCUMULATE WITH VOLTAGE TRACKING MODULATION

BACKGROUND

A multiplier-accumulator (MAC) is a device that performs a multiply-accumulate operation. For example, the multiply-accumulate operation may include multiplying two values and adding the product to an accumulator.

An artificial neuron may include circuitry that receives one or more input signals and, based on the inputs, generates an output signal, which may be, for example a voltage, a current, a digital value, etc. Artificial neural networks are collections of artificial neurons in which the output signals of some neurons are used as the input signals of other neurons.

DETAILED DESCRIPTION

Figure 1:
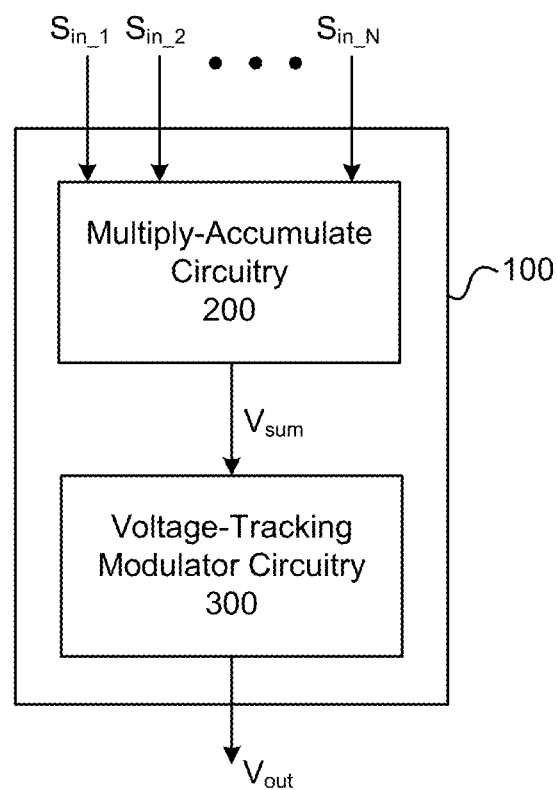
FIG. 1 illustrates an example device with multiply-accumulate circuitry and voltage tracking modulator circuitry.

The multiply-accumulate operation may be performed on a variety of types of inputs and may have a variety of types of outputs. For example, one MAC might receive multi-bit digital numbers as inputs, perform digital multiplication and accumulate the numbers, and output a multi-bit digital number. As another example, a different MAC may receive analog voltage signals as inputs, multiply and accumulate the voltages, and output an analog voltage signal.

However, certain applications may not be adequately served by MACs that are designed to receive analog signals or digital signals as inputs and/or output analog signals or digital signals. Thus, example devices disclosed herein may be to perform a multiply-accumulate operation and output a continuous-time binary signal as the output signal thereof, where the continuous-time binary signal is neither an analog signal nor a digital signal. Specifically, example devices may include multiply-accumulate circuitry that is designed to perform the multiply-accumulate operation and voltage tracking modulator circuitry that is to generate the continuous-time binary output signal, which tracks changes of an accumulator of the multiply-accumulate circuitry by varying pulse widths of the output signal. Furthermore, in certain example devices, the multiply-accumulate circuitry may be to receive one or more input signals and perform the multiply-accumulate on these input signals, where the input signals are also continuous-time binary signals.

As used herein, a "continuous-time binary signal" is a signal that alternates between two discrete logic levels, thus forming a train of high and low pulses, with the width of each pulse varying continuously within a range of possible widths. The continuous-time binary signal may encode information in the width of each pulse; in particular, the continuous-time binary signal may contain information about the rate of change (e.g., time derivative) of an accumulation voltage of the multiply-accumulate circuitry. As used herein, a "digital signal" is a signal that alternates between two discrete logic levels, thus forming a train of high and low pulses, with the width of each pulse being one of a discrete set of possible widths. As used herein, an "analog signal" is a signal whose value may vary continuously across a continuous range of values and across a continuous domain of time.

The continuous-time binary signal differs from a digital signal at least in that in a digital signal each pulse width is one of a discrete set of pulse widths (as opposed to each pulse width varying continuously). In other words, the digital signal may alternate between a discrete set of waveforms, whereas the waveform of the continuous-time binary signal may vary continuously. In addition, in a digital signal discrete digital values (e.g., 1's and 0's) are generally encoded in the amplitude of the signal at discrete sample timings, whereas in the continuous-time binary signal continuous-valued information is encoded in the widths of pulses and there are no discrete sample timings (the continuous-time binary signal is continuous in time).

The continuous-time binary signal differs from an analog signal in that the continuous-time binary signal alternates between two discrete levels, whereas the value of the analog signal may vary continuously. In other words, while the waveforms of both the analog signal and the continuous-time binary signal may vary continuously, the waveform of the analog signal is free to vary continuously in both amplitude and time, whereas the waveform of the continuous-time binary signal may vary continuously in time (e.g., may continuously vary pulse widths) but varies in amplitude only between two discrete voltage levels. In addition, in an analog signal information is generally encoded in the amplitude or frequency of the signal, whereas in the continuous-time binary signal information is also encoded in the widths of pulses.

Example devices whose output signals and/or input signals are continuous-time binary signals may be particularly advantageous in applications such as neural networks. In particular, example neurons of a neural network may each include the multiply-accumulate circuitry and the voltage tracking modulator circuitry described above, and because these neurons are designed to use continuous-time binary signals as input signals and outputs signals, certain problems that may be associated with using analog signals or digital signals in the neural network may be avoided.

For example, neural networks often have very large numbers of neurons, which results in extremely large numbers of signals (each neuron may have multiple inputs). However, if analog signals are used for the input/output signals of such neural networks, then in certain contexts significant difficulties may arise in distributing accurate voltage or current signals across the multiple layers of interconnect that may be included in the neural network. In particular, the analog signals may be prone to significant signal corruption, short range, and expensive fan-out. On the other hand, although multi-bit digital values may pass through interconnects of the neural network without as much corruption as analog signals, these signals may need large digital busses (which quickly limit the size and span of interconnects in the neural network) or serial schemes (which may use up expensive silicon real estate for handshaking transmitters and receivers).

In contrast, example neurons that use continuous-time binary signals as input/output signals may be able to avoid the short range and signal corruption limitations of analog signals without needing the digital busses or serial schemes of digital signals. For example, because continuous-time binary signals alternate between two discrete voltage levels (in contrast to the analog signals), they may be buffered and fanned-out in a fashion similar to digital signals, which may allow for the signals to be carried over longer distances with less signal corruption than analog signals; moreover, because such buffering and fanning out may be accomplished with standard digital cells (e.g., inverters), the design of interlayer interconnects in the neural network may be less complicated and costly than attempting to do the same with analog signals. As another example, because the continuous-time binary signals encode continuous-valued information in continuously varying pulse widths rather than encoding discrete digital values (e.g., 1's and 0's) in pulse amplitudes, digital busses or serial schemes that may be needed for digital signals may not necessarily be needed for the continuous-time binary signals. In addition, the continuous-time binary signal is able to efficiently utilize the bandwidth available on interconnects between layers.

[Example Voltage-Tracking Multiplier-Accumulator Devices]

As noted above, example devices may include multiply-accumulate circuitry that is designed to perform the multiply-accumulate operation and voltage tracking modulator circuitry that is to generate the continuous-time binary output signal, which tracks changes of an accumulator of the multiply-accumulate circuitry by varying pulse widths of the output signal. For example, FIG. 1 illustrates and example device 100 that includes multiply-accumulate circuitry 200 and voltage tracking modulator circuitry 300.

[Example Multiply-Accumulate Circuitry]

The example multiply-accumulate circuitry 200 of FIG. 1 may receive a number of input signals $S_{in}$, and increase/decrease an accumulation voltage $V_{sum}$ held by an accumulator (for example, a capacitor) based on the input signals $S_{in}$ and on weightings associated with the input signals. Specifically, the multiply-accumulate circuitry 200 may add charge and remove charge from the accumulator, with the amounts of charge that are added/removed depending on the input signals $S_{in}$ and on the weightings. When the input signals $S_{in}$ are continuous-time binary signals, the multiply-accumulate circuitry 200 may add charge to the accumulator when an input signal $S_{in}$ is at one binary value (e.g., high) and may remove charge from the accumulator when an input signal $S_{in}$ is at the other binary value (e.g., low), with the amount of charge added/removed depending on the weighting associated with the signal. In such examples, the weighting of the input signals $S_{in}$ corresponds to the multiply function of the multiply-accumulate operation, while the adding/subtracting of charge corresponds to the accumulation function of the multiply-accumulate operation. In FIG. 1, multiple input signals $S_{in}$ are illustrated—namely, input signals $S_{in\_1}$ through $S_{in\_N}$, where N is any integer greater than or equal to 2. However, it should be understood that a single input signal $S_{in}$ could be included.

Figure 2:
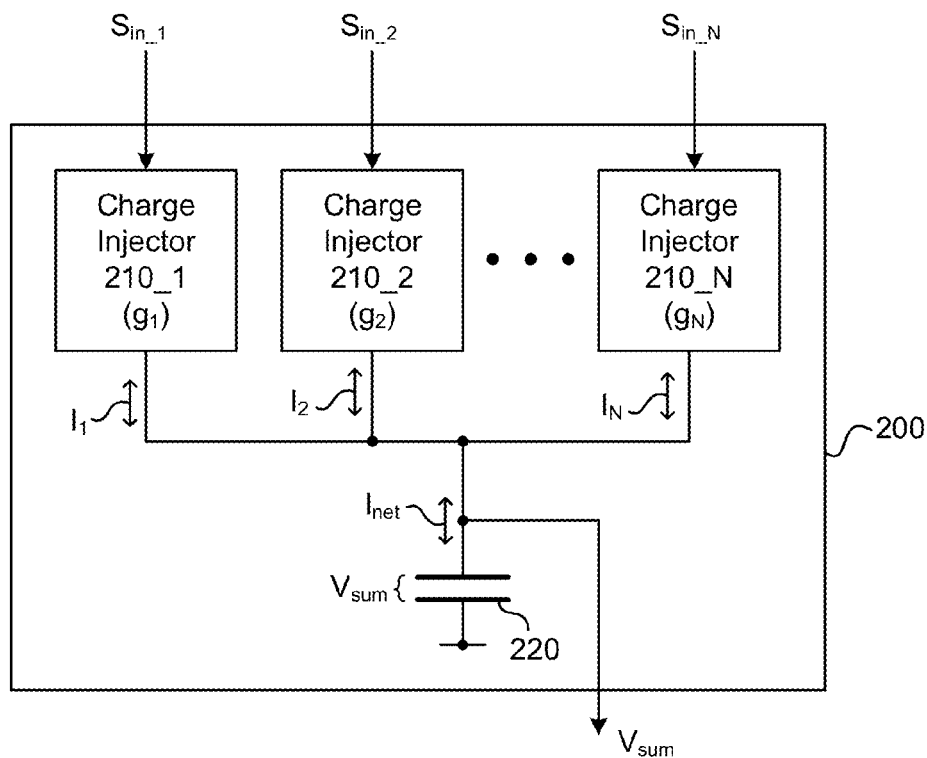
FIG. 2 illustrates an example multiply-accumulate circuitry.
Figure 7:
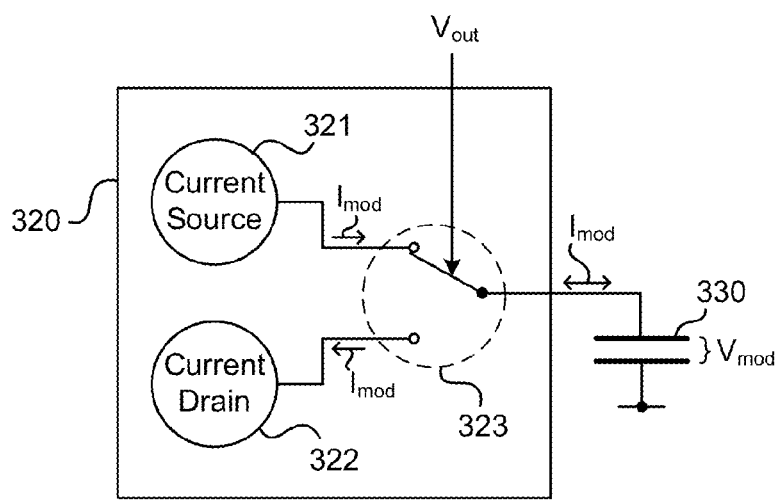
FIG. 7 illustrates an example charge injector of an example voltage tracking modulator circuitry.

For example, FIG. 2 illustrates one specific implementation of the multiply-accumulate circuitry 200. The example multiply-accumulate circuitry 200 may include a number of charge injectors 210_k (at least one for each input signal $S_{in\_k}$), and an accumulation capacitor 220. The accumulation capacitor 220 serves as the accumulator of the example multiply-accumulate circuitry 200. Each of the charge injectors 210_k may be to receive an input signal $S_{in\_k}$ and add/subtract charge to/from the capacitor 220 based on the output signal corresponding input signal $S_{in\_k}$. In particular, the charge injectors 210_k may cause respective currents that have respective magnitudes $I_{mod}$ to flow to or from the capacitor 220, where the direction of each of the currents is switched based on the polarity of the corresponding input signal $S_{in\_k}$. In particular, the $n^{th}$ charge injector 210_n may cause a current of magnitude $I_n$ to flow to the capacitor 220 whenever the $n^{th}$ input signal $S_{in\_n}$ is at a first binary level (e.g., logical high) and may cause a current of magnitude $I_n$ to flow away from the capacitor 220 whenever the $n^{th}$ input signal $S_{in\_n}$ is at a second binary level (e.g., logical low). The currents from all of the charge injectors 210_k collectively combine to form a net current $I_{net}$ that flows to/from the capacitor 220, thereby changing the accumulation voltage $V_{sum}$ that is held by the capacitor 220. FIGS. 5B and 7 illustrate examples of the charge injectors 210_k in greater detail.

The charge injectors 210_k may have respective weightings $g_k$ that are associated with the respective signals $S_{in\_k}$. The weightings $g_k$ may control the magnitudes of the currents $I_k$ that are respectively generated by the charge injectors 210_k. Thus, for example, if the input signals $S_{in\_1}$ and $S_{in\_2}$ were identical during a given period of time and if $g_2=2 \cdot g_1$, then the magnitude $I_2$ of the current created by the charge injector 210_2 during the given period of time would be twice the magnitude $I_1$ of the current created by the charge injector 210_1 during the given period of time. Thus, the weightings $g_k$ applied by the charge injectors 210_k achieve the "multiply" portion of the multiply-accumulate operation, while the capacitor 220 achieves the "accumulate" portion of the multiply-accumulate operation.

Figure 3:
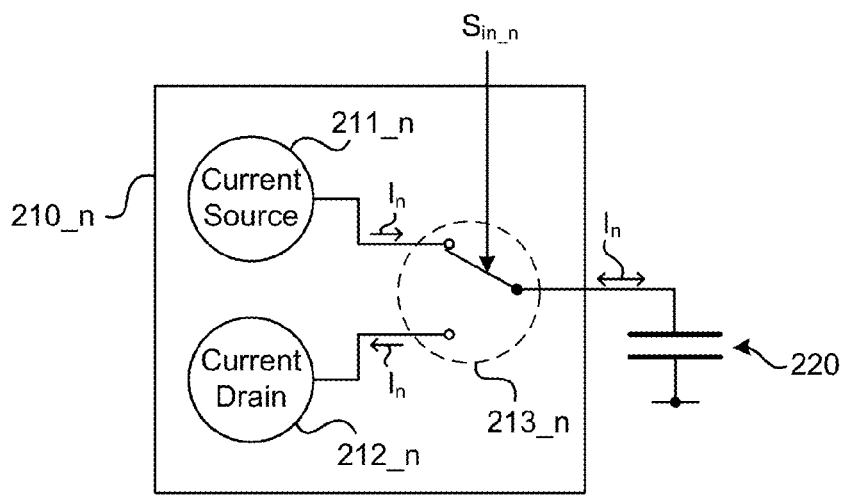
FIG. 3 illustrates an example charge injector of an example multiply-accumulate circuitry.

For example, FIG. 3 illustrates one specific implementation of the charge injectors 210_k of the multiply-accumulate circuitry 200, by reference to an example $n^{th}$ charge injector 210_n. The example charge injector 210_n includes a current source 211_n, a current drain 212_n, and a switch 213_n. The switch 213_n is to selectively connect the current source 211_n or the current drain 212_n to the capacitor 220 based on the polarity of the input signal $Si_{n\_n}$. In particular, when $Si_{n\_n}$ is high the switch 213_n may select the current source 211_n, and when $Si_{n\_n}$ is low the switch 213_n may select the current drain 212. The current source 211_n may be configured to cause a current of magnitude $I_n$ to flow to the capacitor 220 when selected by the switch 213_n. The current drain 212_n may be configured to cause a current of magnitude $I_n$ to flow away from the capacitor 220 when selected by the switch 213_n. The current source 211_n and the current drain 212_n may be configured such that the magnitude $I_n$ of their respective currents may be variably set based on a weighting $g_n$. In particular, the current source 211_n and the current drain 212_n may be configured such the magnitude $I_n$ of their respective currents is given by $I_n=g_n \cdot I_{ref}$, where $I_{ref}$ is a reference current. In certain examples, $I_{ref}$ may be equal to $I_{mod}$ (described further below).

Figure 4:
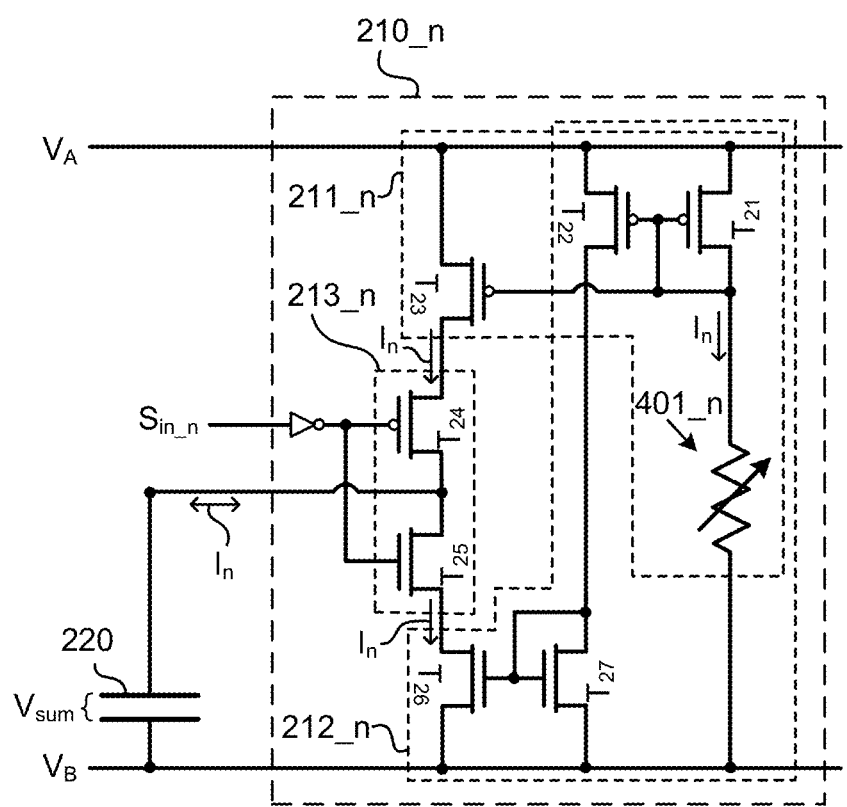
FIG. 4 illustrates an example current source, an example current drain, and an example switch of an example charge injector.
Figure 8:
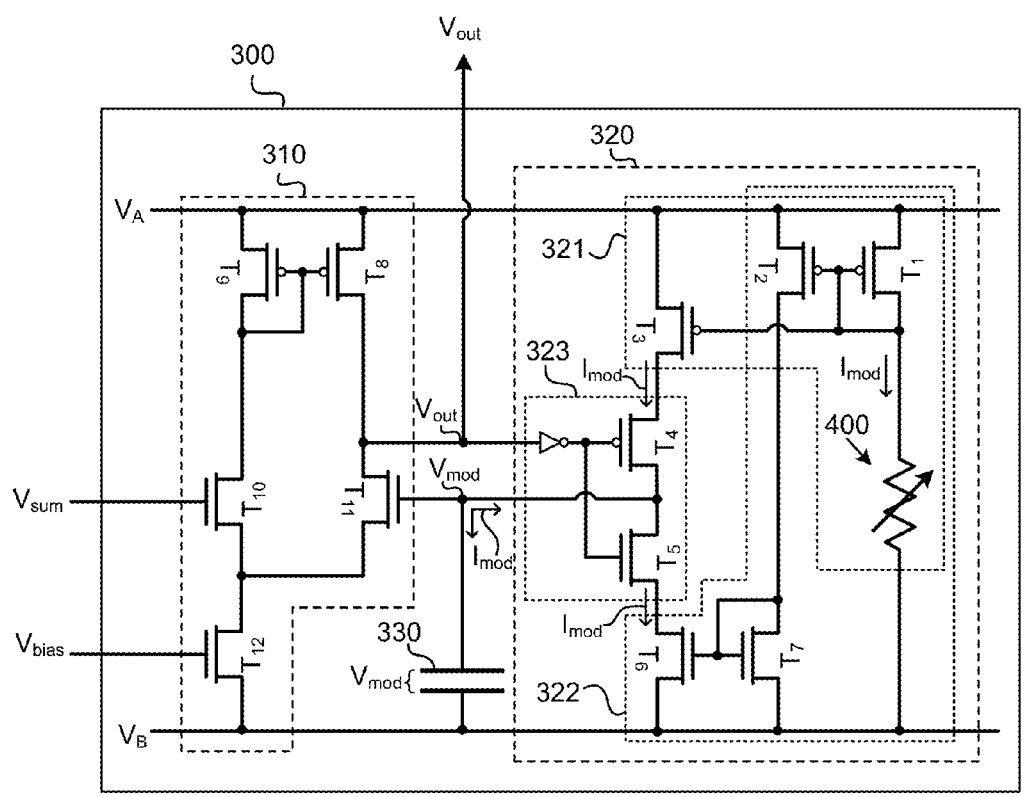
FIG. 8 illustrates an example current source, an example current drain, and an example switch of an example charge injector of an example voltage tracking modulator circuitry, as well as an example differential amplifier of the example voltage tracking modulator circuitry.

For example, FIG. 4 illustrates specific implementations of the current source 211_$n$, the current drain 212_$n$, and the switch 213_$n$ of the example charge injector 210_$n$, as well as a specific example of how these elements may be configured relative to one another in the example charge injector 210_$n$. The charge injector 210_$n$ may include transistors $T_{21}$ through $T_{27}$ and a variable resistance resistor 401_$n$. The transistors $T_{24}$ and $T_{25}$ form the switch 213_$n$. The transistors $T_{21}$-$T_{23}$ and the variable resistance resistor 401_$n$ form the current source 211_$n$. The transistors $T_{21}$, $T_{22}$, $T_{26}$, and $T_{27}$ and the variable resistance resistor 401_$n$ form the current drain 212_$n$. The voltage $V_A$ and the voltage $V_B$ may be such that $V_A$>$V_B$; for example, $V_A$ may be a positive power supply voltage ($V_{DD}$) and $V_B$ may be a ground voltage GND or a negative power supply voltage (Vss). In certain examples, the example charge injector 210_$n$ has a similar architecture as that of the example charge injector 330 of the voltage tracking modulator circuitry that is illustrated in FIG. 8 (described further below).

In the configuration illustrated in FIG. 4, a current of magnitude $I_n$ flows from $V_A$ to $V_B$ through the transistor $T_{21}$ and the variable resistance resistor 401_$n$. The transistors $T_{23}$ and $T_{22}$ are configured to mirror the current flowing through $T_{21}$, and the transistors $T_{26}$ and $T_{27}$ are configured to mirror the current flowing through the transistor $T_{22}$, and therefore the magnitudes of the currents flowing through all of these transistors are equal to $I_n$. The magnitude of the current $I_n$ depends on the resistance of the variable resistance resistor 401_$n$. Thus, by adjusting the resistance of the variable resistance resistor 401_$n$, the magnitude of current flowing through each of the transistors $T_{21}$ through $T_{27}$—namely $I_n$—may be controlled. In this example, the resistance of the variable resistance resistor 401_$n$ corresponds to the weighting $g_n$; thus the weightings $g_k$ of the charge injectors 210_$k$ may be variable set by changing the respective resistances of their respective variable resistance resistors 401_$k$.

The variable resistance resistors 401_$k$ may be any resistive circuit elements that are capable of selectively changing resistance states. For example, the variable resistance resistors 401_$k$ may be memristors. As another example, the variable resistance resistors 401_$k$ may be transistors operating in liner (ohmic) mode, in which case the channel resistances thereof may be varied by varying respective voltages applied to the respective gates of the transistors. As another example, the variable resistance resistors 401_$k$ may comprise circuit elements that change their respective resistances by changing respective current path through the circuit elements—for example, the variable resistance resistors 401_$k$ may each comprise multiple resistors with different resistances and a switch that selects which of the resistors the current path flows through.

[Example Voltage Tracking Modulator Circuitry]

The example voltage tracking modulator circuitry 300 of FIG. 1 may generate the output signal $V_{out}$ by continuously comparing the accumulation voltage $V_{sum}$ to a modulation voltage $V_{mod}$ and outputting either a first binary level (e.g., high logical value) or a second binary level (e.g., low logical value) as a result of the comparison. In particular, when the modulation voltage $V_{mod}$ is less than the accumulation voltage $V_{sum}$, the circuitry 300 may output a high logical value for $V_{out}$, and when the modulation voltage $V_{mod}$ is greater than the accumulation voltage $V_{sum}$ the circuitry 300 may output a low logical value for $V_{out}$. Thus, the output signal $V_{out}$ changes polarity whenever $V_{mod}$ rises above or falls below (crosses) $V_{sum}$.

The example voltage tracking modulator circuitry 300 may also cause the modulation voltage $V_{mod}$ to continually increase or decrease based on the output signal $V_{out}$, with the modulation voltage $V_{mod}$ being increased when the output signal $V_{out}$ is at the first binary level (e.g., high logical value) and decreased when the output signal $V_{out}$ is at the second binary level (e.g., low logical value). Combining this fact with the fact that the output signal $V_{out}$ changes polarity when $V_{mod}$ crosses $V_{sum}$, it can be seen that the modulation voltage $V_{mod}$ will tend to continuously oscillate around the accumulation voltage $V_{sum}$, thereby "tracking" the accumulation voltage $V_{sum}$.

Figure 5A:
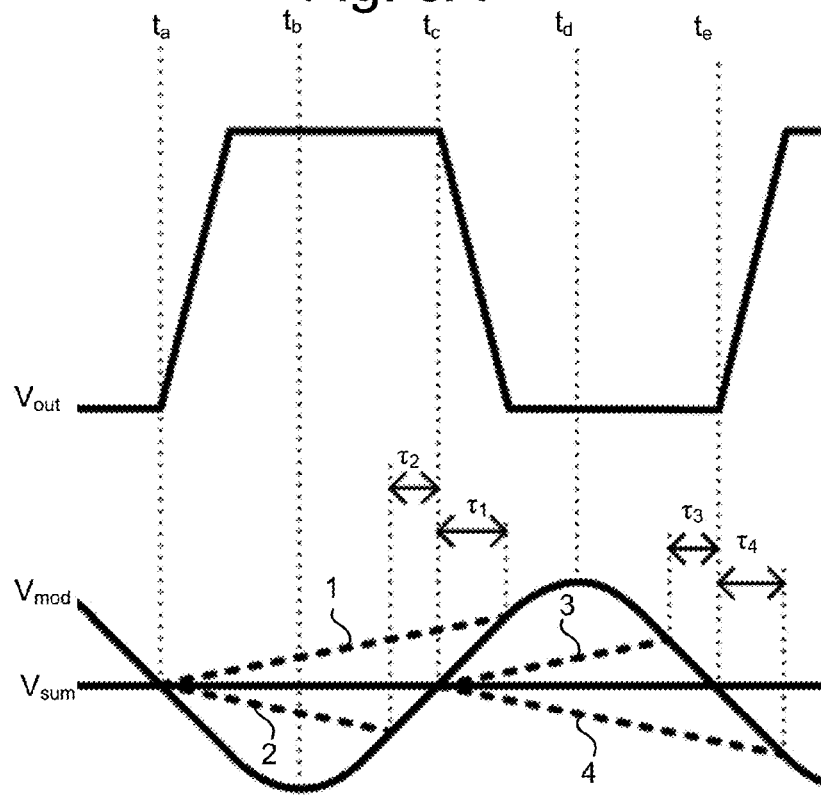
FIG. 5A is a signal diagram illustrating an output signal, a modulation voltage, and an accumulation voltage.
Figure 5B:
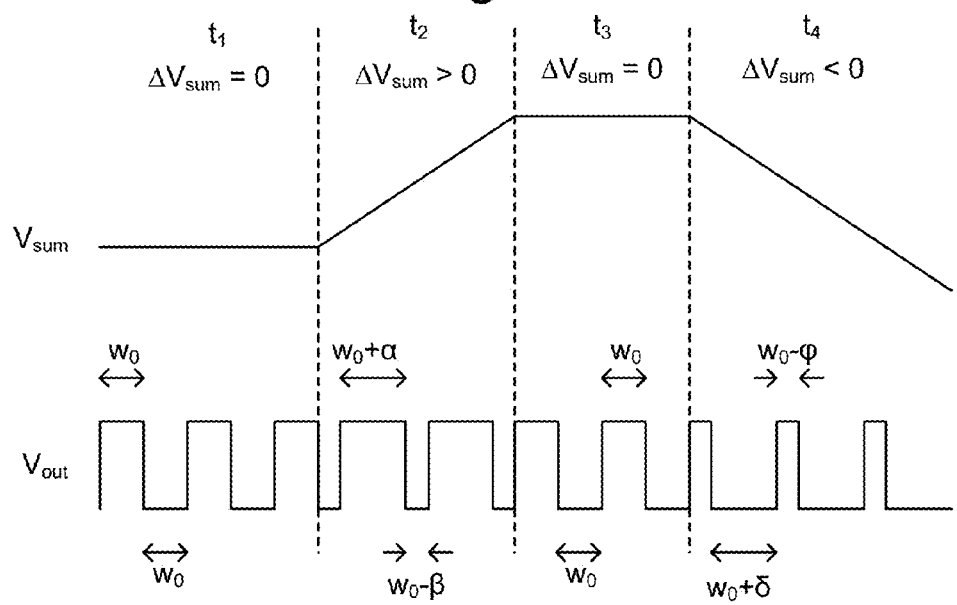
FIG. 5B is a signal diagram illustrating how pulse widths of an output signal may vary according to changes in an accumulation voltage.

For example, consider FIGS. 5A and 5B, which illustrates signal diagrams that have stylized representations of the signals $V_{mod}$, $V_{sum}$, and/or $V_{out}$. Note that some of the features of the signals $V_{mod}$, $V_{sum}$, and $V_{out}$ (e.g., slew, pulse width, amplitude, slope, frequency, period etc.) have been distorted in the diagrams to aid understanding. In FIG. 5A, the modulation voltage $V_{mod}$ falls below the accumulation voltage $V_{sum}$ at time $t_a$. Because $V_{mod}$<$V_{sum}$ at time $t_a$, the output signal $V_{out}$ will switch to high. In addition, once $V_{out}$ has switched to high, the modulation voltage $V_{mod}$ will start increasing. However, due to the finite response time and slew rate of any practical circuit, the modulation voltage $V_{mod}$ will start increasing at time $t_b$, which is some small but finite amount of time after $t_a$. During the time between $t_a$ and $t_b$ the modulation voltage $V_{mod}$ was decreasing, and thus $V_{mod}$ will have fallen below $V_{sum}$ by some finite amount. Thus, after $t_b$ when $V_{mod}$ starts increasing, it will take some finite period of time for the modulation voltage $V_{mod}$ to catch up to the accumulation voltage $V_{sum}$ at time $t_c$. Once $V_{mod}$ has crossed $V_{sum}$ at time $t_c$ and $V_{mod}$>$V_{sum}$, the output signal $V_{out}$ will flip from high to low. As a result of the output signal $V_{out}$ flipping from high to low, the modulation voltage $V_{mod}$ will start decreasing some finite amount of time after $t_c$, namely at time $t_d$. After starting to decrease at time $t_d$, the modulation voltage $V_{mod}$ will eventually fall below the accumulation voltage $V_{sum}$ at time $t_e$, and the sequence described above repeats itself. Thus, the modulation voltage continuously oscillates around the accumulation voltage $V_{sum}$, and the output signal $V_{out}$ continuously switches between high and low values.

The continuous-time binary output signal $V_{out}$ encodes information in the widths of the high and low pulses. In particular, the output signal $V_{out}$ encodes information about the rate of change $\Delta V_{sum}$ (e.g., time derivative) of the accumulation voltage $V_{sum}$. Specifically, the width of each pulse depends on $\Delta V_{sum}$ at the time that the pulse is being generated. The larger $\Delta V_{sum}$ is, the wider the high pulses will be. Conversely, the more negative $\Delta V_{sum}$ is, the wider the low pulses are. This phenomenon may be explained by the fact that the amount of time it takes for $V_{mod}$ to "catch back up" to $V_{sum}$ after crossing $V_{sum}$ will depend on whether and how much $V_{sum}$ is decreasing or increasing at the time.

For example, in FIG. 5A, the accumulation voltage $V_{sum}$ is illustrated as not changing ($\Delta V_{sum}$=0); in this state, $t_c$-$t_a$ is the width of the high pulse and $t_e$-$t_c$ is the width of the low pulse. The pulse width when $\Delta V_{sum}$=0 may be referred to herein as the baseline width $w_0$. However, suppose that $V_{sum}$ was increasing after $t_a$ at some rate $\Delta V_{sum}$>0, as illustrated by the dashed line 1; in such a case, $V_{mod}$ would not cross $V_{sum}$ until some amount of time $\tau_1$ after $t_c$ due to the fact that $V_{sum}$ is increasing. Conversely, suppose $V_{sum}$ was decreasing after $t_a$ at some rate $\Delta V_{sum}$<0, as illustrated by the dashed line 2; in such a case, $V_{mod}$ would cross $V_{sum}$ some amount of time $T_2$ before $t_c$ due to the fact that $V_{sum}$ is decreasing. Similarly, suppose that $V_{sum}$ was increasing after $t_c$ at some rate $\Delta V_{sum}>0$, as illustrated by the dashed line 3; in such a case, $V_{mod}$ would cross $V_{sum}$ some amount of time $\Sigma_3$ before $t_e$ due to the fact that $V_{sum}$ is decreasing. Conversely, suppose $V_{sum}$ was decreasing after $t_c$ at some rate $\Delta V_{sum}<0$, as illustrated by the dashed line 4; in such a case, $V_{mod}$ would not cross $V_{sum}$ until some amount of time $\tau_4$ after $t_e$ due to the fact that $V_{sum}$ is increasing.

By visually projecting what would happen if the slopes of the lines 1-4 were changed, one can intuitively grasp that the larger $\Delta V_{sum}$ is (the steeper the upward slope of $V_{sum}$) the greater $\tau_1$ and $\tau_3$ will be, whereas the more negative $\Delta V_{sum}$ is (the steeper the downward slope of $V_{sum}$, the greater $\tau_2$ and $\tau_4$ will be. Thus, the larger $\Delta V_{sum}$ is, the wider high pulses are and the narrower low pulses are, and the more negative $\Delta V_{sum}$ is, the narrower high pulses are and the wider low pulses are. For example, FIG. 5B illustrates an accumulation voltage $V_{sum}$ that is constant during time periods $t_1$ and $t_3$, is increasing in time period $t_2$, and is decreasing in time period $t_4$. When $\Delta V_{sum}=0$ (period $t_1$ and $t_3$), the pulse widths of high and low pulses are at the baseline width $w_0$. When $\Delta V_{sum}$ is positive (time period $t_2$), then the widths of high pulses of $V_{out}$ are greater than $w_0$ and the widths of the low pulses of $V_{out}$ are less than $w_0$. When $\Delta V_{sum}$ is negative (period $t_4$), then the widths of low pulses of $V_{out}$ are greater than $w_0$ and the widths of the high pulses of $V_{out}$ are less than $w_0$.

Figure 6:
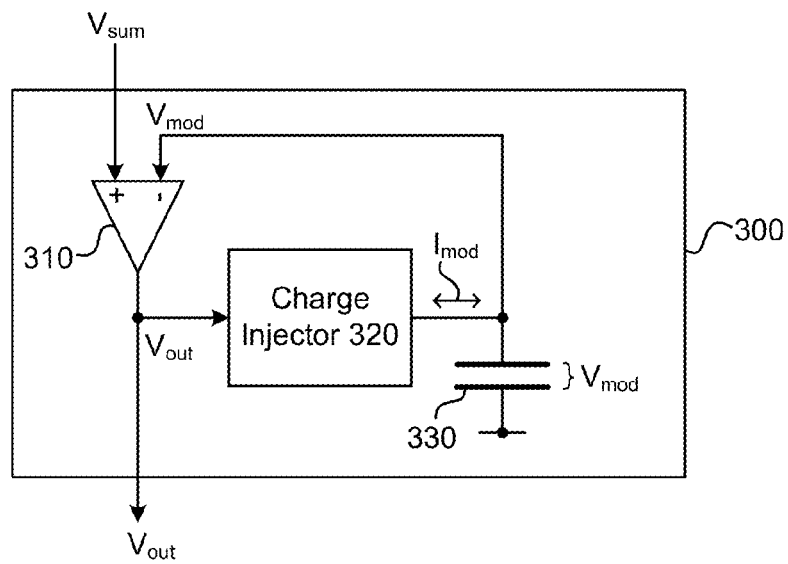
FIG. 6 illustrates an example voltage tracking modulator circuitry.

FIG. 6 illustrates a specific example of the voltage tracking modulation circuitry 300. The example voltage tracking modulation circuitry 200 may include a differential amplifier 310, a charge injector 320, and a modulation capacitor 330. The differential amplifier 310 may compare the accumulation voltage $V_{sum}$ with a modulation voltage $V_{mod}$ that is held by the capacitor 330, and output the output signal $V_{out}$ as a result of the comparison. In particular, if the modulation voltage $V_{mod}$ is less than the accumulation voltage $V_{sum}$, then the output of the differential amplifier 310 is a high logical value, whereas if the modulation voltage $V_{mod}$ is greater than the accumulation voltage $V_{sum}$, then the output of the differential amplifier 310 is a low logical value. The charge injector 320 may add/subtract charge to/from the capacitor 330 based on the output signal $V_{out}$. In particular, the charge injector 320 may cause a current that has magnitude $I_{mod}$ to flow to or from the capacitor 330, where the direction of the current is switched based on the polarity of the output signal $V_{out}$. In particular, whenever the output signal $V_{out}$ is high the charge injector 320 causes a current of magnitude $I_{mod}$ to flow to the capacitor 330, and whenever the output signal $V_{out}$ is low the charge injector 320 causes a current of magnitude $I_{mod}$ to flow away from the capacitor 330. Thus, the modulation voltage $V_{mod}$ that is held by the capacitor 330 is increased and decreased based on the high and low pulses of the output signal $V_{out}$. In certain examples, the charge injector 320 of the voltage tracking modulation circuitry 300 may have a similar architecture as the charge injectors 210_k of the multiply-accumulate circuitry 200.

FIG. 7 illustrates a specific example of the charge injector 320 of the example voltage tracking modulator circuitry 300. The example charge injector 320 includes a current source 321, a current drain 322, and a switch 323. The switch 323 is to selectively connect the current source 321 or the current drain 322 to the capacitor 330 based on the polarity of the output signal $V_{out}$. In particular, when $V_{out}$ is high the switch 323 may select the current source 321, and when $V_{out}$ is low the switch 323 may select the current drain 322. The current source 321 may be configured to cause a current of magnitude $I_{mod}$ to flow to the capacitor 330 when selected by the switch 323. The current drain 322 may be configured to cause a current of magnitude $I_{mod}$ to flow away from the capacitor 330 when selected by the switch 323.

FIG. 8 illustrates specific implementations of the differential amplifier 310, the current source 321, the current drain 322, the switch 323 of the example voltage tracking modulation circuitry 300, as well as a specific example of how these elements may be configured relative to one another. In particular, the voltage tracking modulation circuitry 300 may include transistors $T_1$ through $T_{12}$, the modulation capacitor 330, and the variable resistance resistor 400. The transistors $T_8$ through $T_{12}$ form the differential amplifier 310, with the gates of the transistors $T_{10}$ and $T_{11}$ serving as the input terminals of the amplifier 310. A bias voltage $V_{bias}$ may control an output level of the amplifier 310. The transistors $T_4$ and $T_5$ form the switch 323. The transistors $T_1$-$T_3$ and the variable resistance resistor 400 form the current source 321. The transistors $T_1$, $T_2$, $T_6$, and $T_7$ and the variable resistance resistor 400 form the current drain 322. The voltage $V_A$ and the voltage $V_B$ may be such that $V_A>V_B$; for example, $V_A$ may be a positive power supply voltage ($V_{DD}$) and $V_B$ may be a ground voltage GND or a negative power supply voltage (Vss).

In the configuration illustrated in FIG. 8, a current of magnitude $I_{mod}$ flows from $V_A$ to $V_B$ through the transistor $T_1$ and the variable resistance resistor 400. The transistors $T_3$ and $T_2$ are configured to mirror the current flowing through $T_1$, and the transistors $T_6$ and $T_7$ are configured to mirror the current flowing through the transistor $T_2$, and therefore the magnitudes of the currents flowing through all of these transistors are equal to $I_{mod}$. The magnitude of the current $I_{mod}$ depends on the resistance of the variable resistance resistor 400. Thus, by adjusting the resistance of the variable resistance resistor 400, the magnitude of the current flowing through each of the transistors $T_1$ through $T_7$—namely $I_{mod}$—may be controlled.

The variable resistance resistor 400 may be any resistive circuit element that is capable of selectively changing resistance states. For example, the variable resistance resistor 400 may be a memristor. As another example, the variable resistance resistor 400 may be a transistor operating in liner (ohmic) mode, in which case the channel resistance thereof may be varied by varying a voltage applied to the gate of the transistor. As another example, the variable resistance resistor 400 may comprise a circuit element that changes its resistance by changing a current path through the circuit element—for example, the variable resistance resistor 400 may comprise multiple resistors with different resistances and a switch that selects which of the resistors the current path flows through.

In the art, the term "memristor" may be used in certain contexts in a broad sense and may be used in certain contexts in a narrow sense. In one narrow sense, "memristor" may refer specifically to circuit elements that exhibit a non-linear relationship between electric charge and magnetic flux (or exhibit a relationship between the time integral of current and the time integral of voltage). In the broad sense, "memristor" refers broadly to any non-volatile memory element that is based on changing resistance states and is read by its resistance. Herein and in the appended claims, "memristor" is always used in the broad sense, unless specifically indicated otherwise; specifically, as used herein, "memristor" refers broadly to any non-volatile memory element that is based on changing resistance states and is read by its resistance. Thus, when it is said that the variable resistance resistor 400 or 401_n may be a "memristor", this may include, for example, a memristor in the narrow sense of the term, a memory element that changes the resistance across a dielectric solid-state material, a phase-change memory element (sometimes referred to as PCM or PCRAM), a conductive-bridging memory element (sometimes referred to as CBRAM or a programmable metallization cell), a magnetoresistive memory element (sometimes referred to as MRAM), or the like.

Various examples of the multiply accumulate circuitry 200 and various examples of the voltage-tracking modulator circuitry 300 were described above. Each of these examples of the multiply accumulate circuitry 200 may be combined with any of the examples of the voltage-tracking modulator circuitry 300 to form and example device 100.

Moreover, in certain example devices (not illustrated), one of the examples of the multiply accumulate circuitry 200 described above may be used while the voltage-tracking modulator circuitry 300 may be omitted. In such examples, the accumulation voltage $V_{sum}$ may be output as an analog signal or may be modulated into some other form by another circuit element (not illustrated).

Furthermore, in certain example devices (not illustrated), one of the examples of the voltage-tracking modulator circuitry 300 described above may be used while the multiply accumulate circuitry 200 may be omitted. In such examples, the voltage-tracking modulator circuitry 300 may receive any arbitrary analog voltage in place of the accumulation voltage $V_{sum}$.

[Example Neural Networks]

The example voltage-tracking multiplier accumulator devices described herein may be used as neurons of a neural network. In particular, a neural network may be formed by at least two neurons, with the output signal of at least one of the neurons being used as the input signal of at least one other of the neurons.

In practice, many neurons may be used in many cascading levels. The number of levels that are used, the numbers of neurons per level, and the manner in which various neurons are connected to one another may be selected arbitrarily according to the desired application for the neural network. In particular, the output signal of any neuron in the neural network may be used as one of the input signals of any neuron (including itself) in the neural network.

When the example voltage-tracking multiplier accumulator devices described herein are used as the neurons, the output signals and/or the input signals of the neurons may be continuous-time binary signals. Therefore, the connections between neurons may be laid out using, for example, standard digital circuit elements for buffering and fan out. Thus, the short range and signal corruption limitations of analog signals need not hamper the layout of the input and output signals of the neurons, allowing extremely large and/or extremely accurate neural networks to be created. Moreover, the digital busses or serial schemes used with digital signals may be omitted, with may save chip space and reduce costs.

Figure 9:
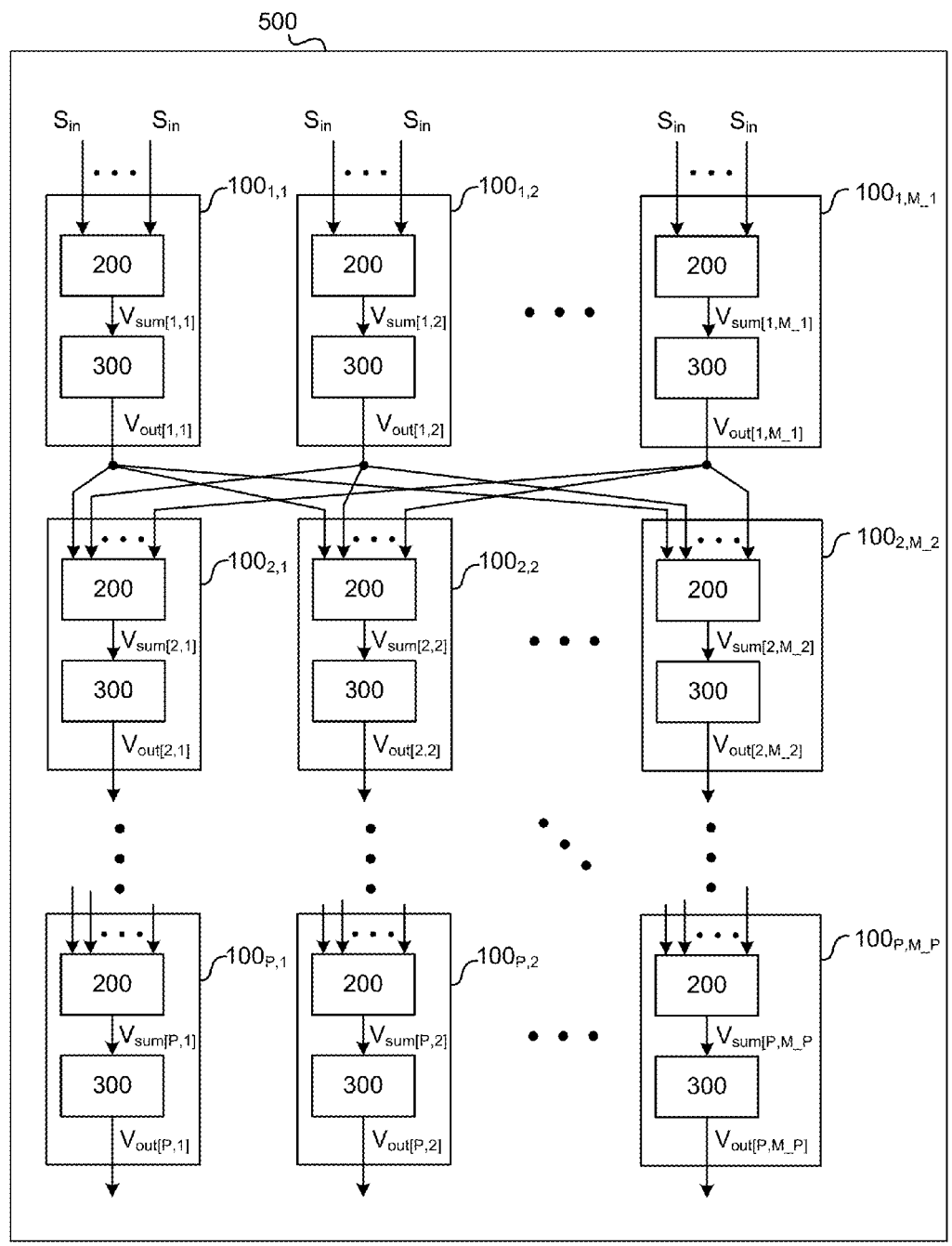
FIG. 9 illustrates an example device that includes a neural network.

FIG. 9 illustrates an example device 500 that has a neural network. The neural network comprises at least two neurons $100_{i,j}$, where each of the neurons $100_{i,j}$ is one of the example devices 100 described above. The index i indicates a level or stage that the neuron $100_{i,j}$ is included in, while the index j identifies the neuron within its respective level or stage. In the example device 500, there are P stages, where P≥2. In each stage, there may be $M_i$ neurons $100_{i,j}$, where $M_i$≥1 for all i (note that each stage does not necessarily have the same number of neurons, and that therefore $M_i$ vary across stages).

The neurons $100_{i,j}$ be connected in any way that is desirable for a particular application. For purposes of illustration, FIG. 9 shows an example in which the neuron $100_{i,j}$ of each stage receive as input signals the output signals of the neurons of the previous stage, but this is merely one example. Specifically, in FIG. 9 the first stage of neurons $100_{1,1}$-$100_{1,M\_1}$ each receive at least one input signal $S_{in}$. The input signal $S_{in}$ that are input to the first stage of neurons $100_{1,1}$-$100_{1,M\_1}$ may come from any source. For example, some or all of the input signal $S_{in}$ that are input to the first stage of neurons $100_{1,1}$-$100_{1,M\_1}$ may supplied to the neural network from an outside source; as another example, some or all of the signals $S_{in}$ may be output signals of any of the neurons $100_{i,j}$. The second stage of neurons $100_{2,1}$-$100_{2,M\_2}$ each receive as input signals the output signals $V_{out[1,1]}$ through $V_{out[1,M\_1]}$ from the first stage neurons $100_{1,1}$-$100_{1,M\_1}$. Similarly, each subsequent stage of neurons $100_{i,j}$ may receive as input signals the output signals of the previous stage up to the final stage of neurons $100_{P,1}$-$100_{P,M\_P}$. The output signals $V_{out[P,1]}$ through $V_{out[P,M\_P]}$ from the final stage may be output from the neural network.

In addition to (or in lieu of) the connections illustrated in FIG. 9, recursive connections may also be used, in which an output signal of a neuron in one stage is fed back as an input signal of a neuron in the same stage or in a previous stage. Moreover, in addition to (or in lieu of) the connections illustrated in FIG. 9, the output signals of one stage may be fed as the input signals of multiple stages, not just of the immediately adjacent stage. Furthermore, each neuron $100_{i,j}$ does not necessarily need to receive the same number of the same type of inputs as the other neurons $100_{i,j}$. In addition, the output signal of any neuron $100_{i,j}$ may be used as an output signal of the neural network, not just the output signals of the final stage of neurons $100_{P,j}$. In addition, signals input from outside the neural network may be used as an input signal for any neuron $100_{i,j}$, not just first stage neurons $100_{1,j}$.

Throughout this disclosure and in the appended claims, occasionally reference may be made to "a number" of items. Such references to "a number" mean any integer greater than or equal to one. When "a number" is used in this way, the word describing the item(s) may be written with the pluralized "s" for grammatical consistency, but this does not necessarily mean that multiple items are being referred to. Thus, for example, a phrase such as "a number of resistors, wherein the resistors . . . " could encompass both one resistor and multiple resistors, notwithstanding the use of the pluralized form.

While the above disclosure has been shown and described with reference to the foregoing examples, it should be understood that other forms, details, and implementations may be made without departing from the spirit and scope of this disclosure.

What is claimed is:

1. A device, comprising:
    multiply-accumulate circuitry that is to increase and decrease an accumulation voltage held by an accumulator based on a number of input signals; and
    voltage-tracking modulator circuitry that is to generate an output signal based on the accumulation voltage, wherein the output signal is a continuous-time binary signal that tracks changes of the accumulation voltage by varying pulse widths of the output signal.

2. The device of claim 1,
    wherein the voltage-tracking modulator circuitry is to generate the output signal by:
        comparing the accumulation voltage to a modulation voltage and outputting the output signal as a result of the comparison, and increasing the modulation voltage when the output signal is at a first binary level and decreasing the modulation voltage when the output signal is at a second binary level.

3. The device of claim 1,
wherein the voltage-tracking modulator circuitry includes:
a capacitor that holds a modulation voltage;
a differential amplifier to which the accumulation voltage and the modulation voltage are input and from which the output signal is output; and
charge injection circuitry that adds charge to the capacitor in response to the output signal being at a first binary level and removes charge from the capacitor in response to the output signal being at a second binary level.

4. The device of claim 3,
wherein the charge injection circuitry includes a current source that is switchably connected to the capacitor via a switch and a current drain that is switchably connected to the capacitor via the switch, and
the output signal controls the switch.

5. The device of claim 1,
wherein the multiply-accumulate circuitry includes a capacitor that holds the accumulation voltage and charge injection circuitry that is to add charge to the capacitor in response to a corresponding one of the input signals being at a first binary level and remove charge from the capacitor in response to the corresponding one of the input signals being at a second binary level.

6. The device of claim 5,
wherein the charge injection circuitry of the multiply-accumulate circuitry includes a variable-resistance resistor that controls a magnitude of a reference current, and
magnitudes of currents flowing from the charge injection circuitry to the capacitor and magnitudes of currents flowing from the capacitor to the charge injection circuitry depend on the reference current.

7. The device of claim 1, further comprising:
a first stage of neurons that includes a first neuron that comprises the multiply-accumulate circuitry and the voltage-tracking modulator circuitry, and
a second stage of neurons,
wherein the output signal is fed to the second stage of neurons as a second-stage input signal.

8. The device of claim 7,
wherein the second stage of neurons includes a second neuron, and
the second neuron includes second multiply-accumulate circuitry that includes a capacitor that holds a second accumulation voltage and charge injection circuitry that is to add charge to the capacitor in response to the second-stage input signal being at a first binary level and remove charge from the capacitor in response to the second-stage input signal being at a second binary level.

9. A device, comprising:
multiply-accumulate circuitry that is to increase and decrease an accumulation voltage held by an accumulator based on a number of input signals; and
voltage-tracking modulator circuitry that is to:
compare the accumulation voltage to a modulation voltage and output a continuous-time binary signal as an output signal based on the comparison, and increase the modulation voltage in response to the output signal being at a first binary level and decrease the modulation voltage in response to the output signal being at a second binary level.

10. The device of claim 9,
wherein the voltage-tracking modulator circuitry includes:
a capacitor that holds the modulation voltage;
a differential amplifier that is to compare the accumulation voltage and the modulation voltage and output the output signal; and
charge injection circuitry that adds charge to the capacitor in response to the output signal being at the first binary level and removes charge from the capacitor in response to the output signal being at the second binary level.

11. The device of claim 10,
wherein the charge injection circuitry includes a current source that is switchably connected to the capacitor via a switch and a current drain that is switchably connected to the capacitor via the switch, and
the output signal controls the switch.

12. The device of claim 9,
wherein the multiply-accumulate circuitry includes a capacitor that holds the accumulation voltage and charge injection circuitry that is to add charge to the capacitor in response to a corresponding one of the input signals being at the first binary level and remove charge from the capacitor in response to the corresponding one of the input signals being at the second binary level.

13. The device of claim 12,
wherein the charge injection circuitry of the multiply-accumulate circuitry includes a variable-resistance resistor that controls a magnitude of a reference current, and
magnitudes of currents flowing from the charge injection circuitry to the capacitor and magnitudes of currents flowing from the capacitor to the charge injection circuitry depend on the reference current.

14. The device of claim 9, further comprising:
a first stage of neurons that includes a first neuron that comprises the multiply-accumulate circuitry and the voltage-tracking modulator circuitry, and
a second stage of neurons,
wherein the output signal is fed to the second stage of neurons as a second-stage input signal.

15. The device of claim 14,
wherein the second stage of neurons includes a second neuron, and
the second neuron includes second multiply-accumulate circuitry that includes a capacitor that holds a second accumulation voltage and charge injection circuitry that is to add charge to the capacitor in response to the second-stage input signal being at the first binary level and remove charge from the capacitor in response to the second-stage input signal being at the second binary level.

16. A device, comprising:
a plurality of neurons that generate respective output signals based on respective numbers of input signals,
wherein each of the plurality of neurons includes:
multiply-accumulate circuitry that is to increase and decrease an accumulation voltage held by an accumulator based on the input signals of the respective neuron, and voltage-tracking modulator circuitry that is to generate the output signal of the respective neuron based on the accumulation voltage, wherein the output signal of the respective neuron is a continuous-time binary signal that tracks changes of the accumulation voltage by varying pulse widths of the output signal of the respective neuron, and the output signal of a first neuron of the plurality of neurons is one of the input signals of a second neuron of the plurality of neurons.

17. The device of claim 16,
wherein, for each of the plurality of neurons, the voltage-tracking modulator circuitry includes:
 a capacitor that holds a modulation voltage for the respective neuron;
 a differential amplifier to which the accumulation voltage of the respective neuron and the modulation voltage of the respective neuron are input and from which the output signal of the respective neuron is output; and
 charge injection circuitry that adds charge to the capacitor of the respective neuron in response to the output signal of the respective neuron being at a first binary level and removes charge from the capacitor of the respective neuron in response to the output signal of the respective neuron being at a second binary level.

18. The device of claim 17,
wherein, for each of the plurality of neurons:
 the charge injection circuitry of the respective neuron includes a switch, a current source that is switchably connected to the capacitor of the respective neuron via the switch, and a current drain that is switchably connected to the capacitor of the respective neuron via the switch, and
 the output signal of the respective neuron controls the switch of the respective neuron.

19. The device of claim 16,
wherein, for each of the plurality of neurons, the multiply-accumulate circuitry of the respective neuron includes a capacitor that holds the accumulation voltage of the respective neuron and charge injection circuitry that is to add charge to the capacitor in response to a corresponding one of the input signals of the respective neuron being at a first binary level and remove charge from the capacitor in response to the corresponding one of the input signals of the respective neuron being at a second binary level.

20. The device of claim 19,
wherein, for each of the plurality of neurons:
 the charge injection circuitry of the multiply-accumulate circuitry of the respective neuron includes a variable-resistance resistor that controls a magnitude of a reference current for the respective neuron, and
 magnitudes of currents flowing from the charge injection circuitry of the respective neuron to the capacitor of the respective neuron and magnitudes of currents flowing from the capacitor of the respective neuron to the charge injection circuitry of the respective neuron depend on the reference current of the respective neuron.

* * * * *